United States Patent
Cao et al.

(10) Patent No.: US 9,226,159 B1
(45) Date of Patent: Dec. 29, 2015

(54) TELEPHONE CALL CHALLENGE TO BLOCK SPAM

(75) Inventors: Jing Cao, Nanjing (CN); Xiangdong Ruan, Nanjing (CN); Juliang Jiang, Nanjing (CN)

(73) Assignee: Trend Micro Inc., Tokyo (JP)

( * ) Notice: Subject to any disclaimer, the term of this patent is extended or adjusted under 35 U.S.C. 154(b) by 724 days.

(21) Appl. No.: 13/418,265

(22) Filed: Mar. 12, 2012

(51) Int. Cl.
  *H04M 1/66* (2006.01)
  *H04W 12/12* (2009.01)

(52) U.S. Cl.
  CPC .................................... *H04W 12/12* (2013.01)

(58) Field of Classification Search
  USPC ....................................... 455/410; 379/88.01
  See application file for complete search history.

(56) References Cited

U.S. PATENT DOCUMENTS

| | | | |
|---|---|---|---|
| 2009/0168755 A1* | 7/2009 | Peng et al. | 370/352 |
| 2010/0158233 A1* | 6/2010 | Caceres et al. | 379/207.02 |
| 2010/0184500 A1* | 7/2010 | Beasley | 463/9 |
| 2011/0211685 A1* | 9/2011 | Liu et al. | 379/201.02 |

* cited by examiner

*Primary Examiner* — Justin Lee
(74) *Attorney, Agent, or Firm* — Beyer Law Group LLP

(57) ABSTRACT

A central computer of a telecommunications company handles an incoming call from a caller. The telephone number of the caller is checked against a white list or blacklist and handled accordingly. If the caller is unknown, a question is played to the caller (optionally selected randomly) along with a number of possible answers. The answers are presented randomly, associated with random identifiers, etc. If the caller selects the correct answer then the call is routed to the receiver's telephone. If not, then the call is terminated or other action taken as specified. The incoming call may also be handled by a mobile telephone or computing device at the user's home or business. The mobile telephone may alert the user when answering the incoming call or wait until the question is answered correctly before ringing the telephone.

18 Claims, 7 Drawing Sheets

Call Challenge System

TELEPHONE CALL CHALLENGE TO BLOCK SPAM

FIELD OF THE INVENTION

The present invention relates generally to prevention of unwanted telephone calls. More specifically, the present invention relates to a technique for challenging incoming calls to block spam.

BACKGROUND OF THE INVENTION

In the recent past, individuals and businesses typically received telephone calls on a landline at their home or business. Times are changing, and not only do many people now carry a mobile telephone with them for personal use or for business, but also there is an increase in unwanted spam telephone calls. This combination of ubiquitous telephones and an increase in spam means that the average person is bothered more and more by unwanted telephone calls that may be received at any time and in any place.

A person may use various techniques to avoid these unwanted calls, but none are optimal. By default, many people simply decide to always answer their telephone wherever they are and whenever it rings; but, this technique can be very inconvenient, frustrating, and can waste time when many of the calls are unwanted. Others might choose to only give out their telephone number to select individuals, but this technique may prevent the individual from receiving important calls from legitimate callers. (And, it is probably inevitable that a spammer will eventually get hold of these secret telephone numbers.) Still others choose to screen their incoming calls (listening to the call until they decide to answer it or not), but this can be annoying for legitimate callers and embarrassing for the receiver. Those that use a caller identification device on their telephone to screen calls may miss calls from legitimate callers that just happen to be calling from an unfamiliar telephone number. Some people choose never to answer their telephone, forcing all callers (legitimate or not) to leave a message. While this technique might thwart certain spammers, it is annoying for legitimate callers and is somewhat inconvenient for the receiver in that they can no longer accept calls immediately.

Therefore, an improved technique is desired that would block or prevent unwanted telephone calls, yet still allow legitimate callers to reach an individual. Such an improved technique should not be burdensome for the callers, yet should still allow a receiver to receive calls promptly.

SUMMARY OF THE INVENTION

To achieve the foregoing, and in accordance with the purpose of the present invention, a telephone call challenge technique is disclosed that allows unwanted calls to be blocked.

In one embodiment, a central computer handles an incoming call from a caller. The telephone number of the caller may be checked against a white list database or a blacklist database and handled accordingly. If the caller is unknown, a question is played to the caller along with a number of possible answers. The answers may be presented randomly, associated with random identifiers, etc. If the caller selects the correct answer then the call is routed to the receiver's telephone (e.g., mobile telephone, computer, home telephone). If not, then the call may be terminated or other action taken as specified by a user.

In a second embodiment, a mobile telephone of a user answers an incoming call from a caller and optionally prevents the telephone from initially ringing. The telephone number of the caller may be checked against a white list database or a blacklist database and handled accordingly. If the caller is unknown, a question is played to the caller along with a number of possible answers. The answers may be presented randomly, associated with random identifiers, etc. If the caller selects the correct answer then the answered call is allowed to ring on the receiver's mobile telephone. If not, then an appropriate action may be taken and the call terminated by the mobile telephone.

In a third embodiment, a computing device at a user's home or place of business answers an incoming call from a caller and optionally prevents the computing device (or an associated telephone) from initially ringing or otherwise alerting the user. The telephone number of the caller may be checked against a white list database or a blacklist database and handled accordingly. If the caller is unknown, a question is played to the caller along with a number of possible answers. The answers may be presented randomly, associated with random identifiers, etc. If the caller selects the correct answer then the answered call is allowed to ring on the receiver's telephone or computer. If not, then an appropriate action may be taken and the call terminated by the computing device.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Many incoming telephone calls these days are unwanted. Generally, these unwanted calls are referred to as spam, and include sales calls, telemarketing calls, wrong numbers, fund-raising calls from political campaigns, calls to perpetuate fraud, phishing calls, etc. Generally, it is observed that the instigator of these calls does not have a personal relationship with the person whom they are calling, or may not be familiar with relevant personal information of that person. By requiring an incoming caller to possess certain basic information about who they are calling, i.e., a challenge requiring a response, the present invention is able to block unwanted calls.

Call Challenge Overview

Figure 1:
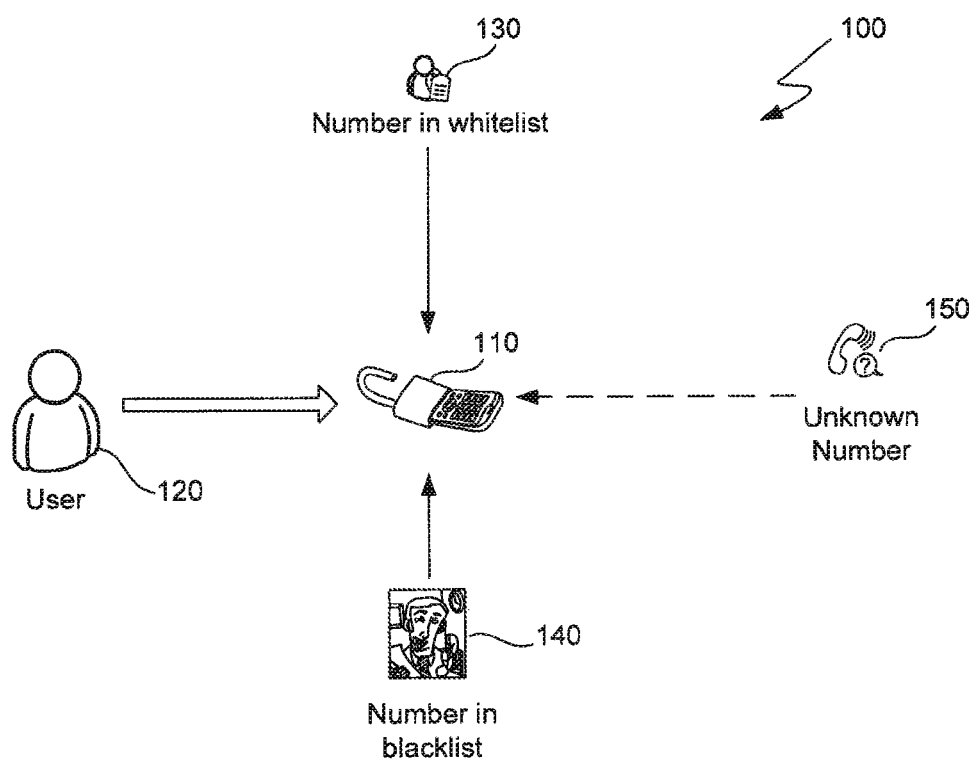
FIG. 1 illustrates a conceptual view of the present invention.

FIG. 1 illustrates a conceptual view of the present invention. A telephone 110 typically receives calls for a user 120 (or for a number of associated people) at a particular telephone number. Telephone 110 may be a mobile telephone, a smartphone, a landline telephone, an office telephone, a home telephone, a cordless telephone, etc. In certain embodiments, telephone 110 may be embodied within a personal computer, laptop computer or smartphone, in those situations where telephone calls are received over the Internet using a service such as Skype, Google Voice, etc. Typically, telephone 110 will be a smartphone carried by a particular individual.

By interacting with his or her telephone, over the telephone, or using another computing device, user 120 is able to set up any number of questions each having several choices but preferably only one correct answer that would be difficult to guess; these questions and associated answers are referred to as the question choice pool. One example question might be "Which is my first name?", and the answers may be: 1) King, 2) Max, 3) David, 4) Tom and 5) Other. Assuming that the correct answer is "David," only those callers selecting the correct answer will be treated as if they have a legitimate reason to call.

The user is also able to preset certain actions to occur when a caller either answers the question correctly or does not. For example, for a caller that cannot answer the question the actions may be: a) reject the call automatically, b) allow the caller to leave a message, or c) add the telephone number of the incoming call to a blacklist. In addition, the user is also able to set up a whitelist of telephone numbers that should always be allowed to ring through, and a blacklist of telephone numbers that should always be blocked.

Also shown in the figure is a telephone number 130 of an incoming call that is in a whitelist database of the user. For these incoming calls, the user may allow that no questions need be asked and the call should be allowed to ring through as normal. By contrast, though, a telephone number 140 present on a user's blacklist database can always be blocked and will not be allowed to ring on the user's telephone.

There may be many incoming telephone calls for which the calling telephone number is unknown to the user (that is, it is not yet present on either the white list or the blacklist). In these situations, the present invention operates to automatically choose a question from the choice pool, play back this question over the telephone to the caller, and then wait for the caller to press a number on his or her telephone keypad in order to answer the question. If the answer is correct, then the user's telephone will ring as normal. If incorrect, the preset action will be executed. The invention may choose a question from the choice pool randomly, and may also randomly assign the numbers associated with the answers. The answers may also be presented in a random order, different answers may be presented each time the same question is asked, etc. In this fashion, the invention allows users to set their own questions having different difficulty levels, and allows certain questions from a pool of questions to be used at different times of day or in different situations at the user's discretion.

Call Challenge System

Generally, the invention may be implemented in different manners and on a variety of computing platforms. For instance, while it may be suitable in some situations to execute an application on a central server on a computer of a telecommunications company, in other situations it may be best to execute an application on a user's smartphone or on another computing device coupled to the receiving telephone.

Figure 2:
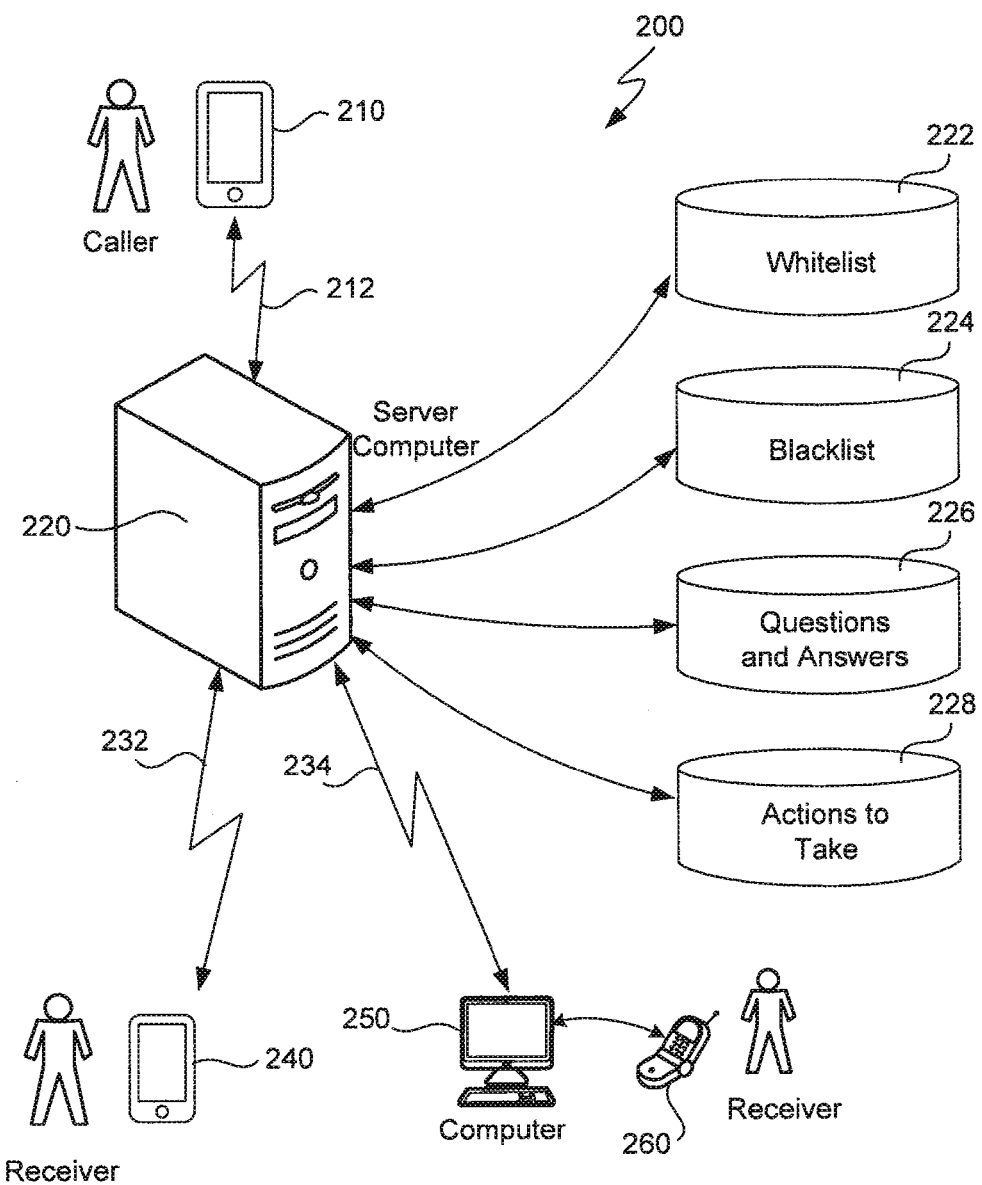
FIG. 2 is a block diagram of embodiments of a call challenge system.

FIG. 2 is a block diagram of embodiments of a call challenge system 200. A caller may be using a telephone 210 to place a spam telephone call. Telephone 210 may be a mobile telephone, a landline, or a computer that communicates with computer 220 via any suitable telecommunications link or network 212. Server computer 220 is any suitable computer or computers operated by: a traditional telecommunications company providing landline service, a mobile telecommunications company providing wireless telephone service, or an Internet service provider or other related company that provides telephone service via the Internet. Computer 220 is arranged to execute the various processes of the present invention as described below and includes various databases (either locally or remotely) 222-228 that will be described in more detail below.

Depending upon the nature of the telephone service, a call is routed over telecommunications link or network 232 to a receiver's telephone. As above, this telephone may be a mobile telephone, a landline, or a computer. In this embodiment, the processes of the present invention may execute upon telephone 240 and the various databases may be present here also. Alternatively, a call may be routed over telecommunications link or network 234 to a computing device 250 at a receiver's home or business. When a receiver has an old-fashioned telephone handset 260 (which may be cordless or have a cord), the call may initially be handled by device 250 which may be an answering machine, a caller identification unit, or other computing device. In a business environment, computer 250 may be a PBX or other hardware and software used by a business to route calls to individual telephones within a building. Device 250 is then able to block or route calls to the handset 260. In this embodiment, the processes of the present invention may execute upon computing device 250 and the various databases may be present there also.

In other embodiments, it is possible for the functionality of the method to be split between the server computer 220 and any of the receiving devices. For instance, the server computer may handle screening incoming calls using a white list or blacklist, yet allow the receiving device to handle playback of the challenge question and checking of the answer.

Set Up Call Challenge System

Figure 3:
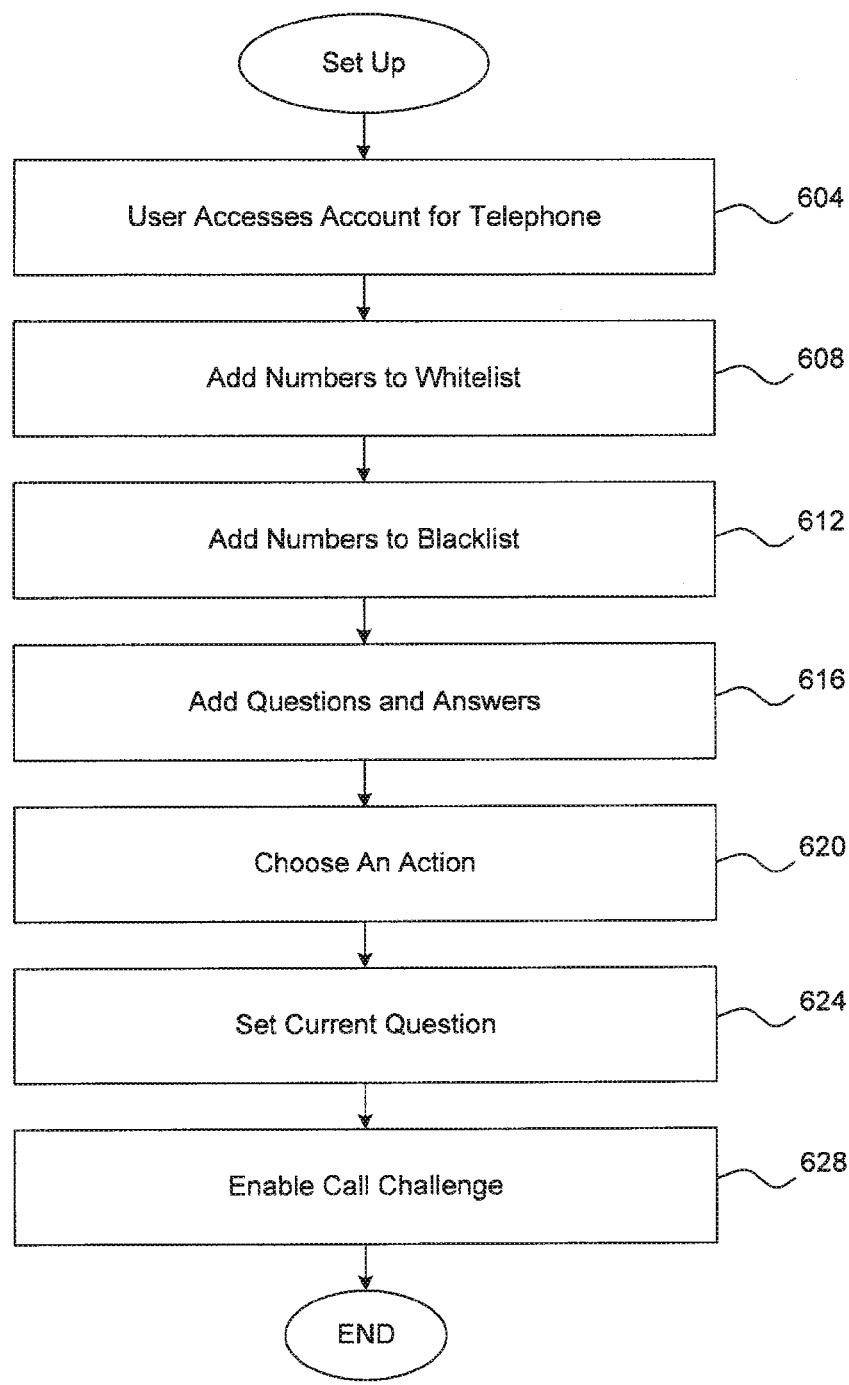
FIG. 3 is a flow diagram describing one embodiment for setting up the call challenge system.

FIG. 3 is a flow diagram describing one embodiment for setting up the call challenge system. These steps may typically be handled by a user interested in blocking unwanted calls, although it is possible for these steps to be handled by a telecommunications provider or another third party. The below description uses the example in which the user performs setup.

In step 604 the user accesses his or her account (or computing device) in order to begin setup of the call challenge system. For implementation on a central server computer 220, the user may call in or access his or her account online, providing name, telephone number, account name, password, etc. For implementation on the user's mobile telephone 240, the user may simply execute the application on their telephone. Implementations on computer 250 are similar in that the user executes an application, possibly providing an account name or individual telephone number (in the case of a business implementation).

In step 608 the user adds any number of telephone numbers to a white list database 222 indicating which calling telephone numbers should be allowed to ring through to his or her telephone. In step 612 the user adds numbers to a blacklist database 224 indicating which telephone numbers should be rejected automatically. Depending upon implementation, these numbers may be added to a central server database by speaking the numbers over a telephone, entering them online, providing a written form, etc. The numbers may be added to a mobile telephone application or computing device 250 by speaking them or typing them.

In step 616 the user provides any number of questions, each question having several answers, and indicates which answer is correct. Depending upon the implementation, the user may supply these questions by speaking them into a telephone, entering them online, typing them into a computing device, submitting a written form, etc. The user also supplies any number of answers to each question and indicates which answer is the correct answer. Preferably, each question should be somewhat personal to the user and only able to be answered correctly if the caller is a friend of the user, is related, has a prior relationship with the user, is familiar with the user, or has some knowledge of the user's workplace, hometown, etc. Therefore, spam calls may be easily blocked because typically such a caller is not aware of any of this information. For example, one question might be "Which is my home town?", and the answers may be: 1) Tucson, 2) Phoenix, 3) Mesa, 4) Scottsdale and 5) Other.

In addition to the user supplying both the question and the answers, it is also possible for the system to supply the questions and answers. For example, the system may have a predefined question such as "How many people are in my immediate family?" The answers would also be predefined and would range from "1" up to "6," and "other." The user would then be prompted to choose the correct answer (e.g., "4" for a married couple with two children). Or, in the case of the question "Who do you wish to call?", the system may simply prompt the user to input their first name. The system would then be able to generate not only this question but also other possible answers by simply having a list of common first names. In this fashion, a question and answers are defined with minimal effort on the part of the user. These questions and answers are stored in database 226.

In step 620 the user chooses an action to take if a strange caller cannot answer the question correctly. These actions may include: rejecting the call automatically; allowing the caller to leave a message; adding the number to a blacklist; playing back a recorded message; etc. Again, these actions may be input by speaking them into a telephone, typing them into a computer, making selections online or in an application executing on a computing device or mobile telephone, etc. Preferably, these actions are predefined by the system and are stored in database 228. Associated with each action in the database are the corresponding commands, code and instructions necessary to complete the action. For example, the "leave message" action includes the necessary commands, functions, etc., necessary to place the caller into the user's voicemail. Or, the "add number to blacklist" action includes the necessary computer code to add the number into the blacklist 224 and then end the call. The user may choose a specific action to be taken for each question, or the user may choose one action to be taken whenever any of the questions is answered incorrectly. It is also possible for the user to define their own actions and supply the necessary commands and instructions for the database 228.

In step 624 the user specifies the current question to be used. Or, the user may allow the system to automatically (or randomly) choose a question from the question choice pool. The user may also specify a question to be used for a certain time of day, for a certain date range, etc. The user may return to the step at any time and select a question to be used or change this option. In step 628 the user enables the call challenge system by speaking a command, pressing a button, typing a character, etc. The user may return to the step at any time in order to enable or disable the system. Of course, the user may also access his or her account or any of these databases at any time in order to add or delete numbers from a white list or blacklist, add, delete or modify questions and answers, add or delete actions, etc.

Call Challenge Implemented on Central Computer

Figure 4:
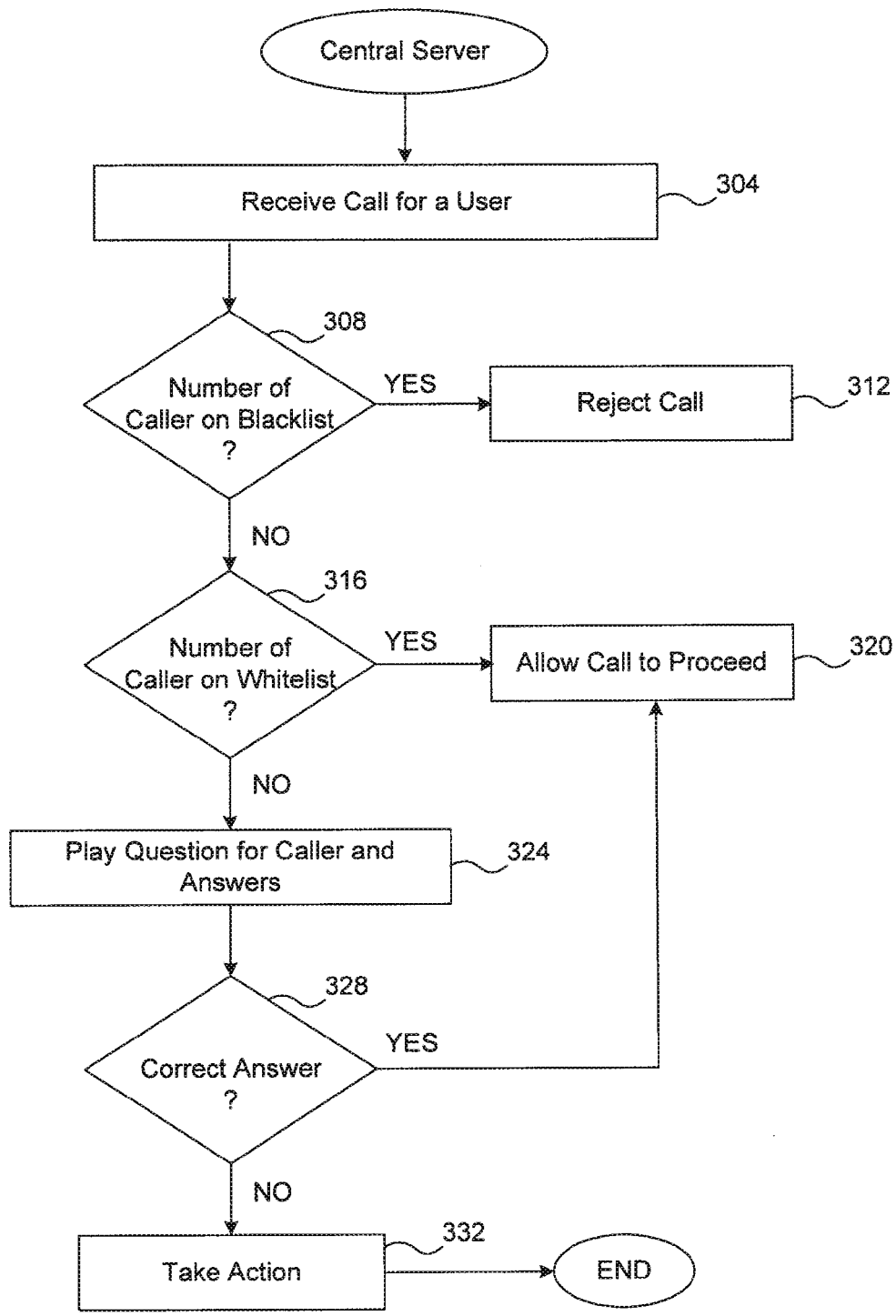
FIG. 4 is a flow diagram describing the embodiment in which the invention executes upon a central server computer.

As mentioned above, the present invention may be implemented exclusively or primarily upon server computer 220. FIG. 4 is a flow diagram describing the embodiment in which the invention executes upon a central server computer. In step 304 a call for a receiver from a caller having a particular telephone number is received at a computer of a telecommunications company. The computer is able to access the receiver's account using the telephone number that the caller wishes to call. Steps 308 and 316 determine whether this telephone number of the caller is present on a white list or blacklist of the receiver. If in a blacklist, then in step 312 the call may be rejected by simply hanging up, by terminating the call, by playing a pre-recorded message, etc. If on a white list, though, in step 320 the call is allowed to proceed over link 232 or 234 in order to ring on the receiver's telephone.

If, however, the caller's number is not present on either list, this indicates an unknown telephone call that might be a spam call. Accordingly, in step 324 the computer 220 then plays back a voice recording of the current question over communications link 212 to be heard on the telephone 210 of the calling party. If instructed by the user, the computer may use the current question designated in step 624. Or, if there are multiple questions, the computer may choose one of the questions randomly, or cycle through the questions sequentially. Once the question has been presented to the caller, the answers are also presented. In one embodiment, each possible answer is presented along with a number (or letter) indicating which key the caller should press (or speak) on his or her calling telephone. The invention is also able to randomly present the possible answers such that the answers appear in a different order each time the question is asked, or, each possible answer is associated with a different number (or letter or character, in general, any identifier) each time the question is asked. The identifier may be associated randomly with each answer each time the answers are presented, or, the identifiers may cycle through the answers in a particular order. In addition, the system may also present different answers to the same question each time the question is asked, e.g., using different first names as answers. In another embodiment, identifying numbers (or letters) for each answer need not be used, and the caller is simply instructed to press a key (or speak a word, such as the actual answer) when the answer is presented. Preferably, each set of answers always includes the choice of "Other," thus making it more difficult for a spammer to guess the correct answer.

The caller is directed to answer the question by speaking a number or word, pressing a button, pressing a key, etc. Any received answer is checked against the possible answers in database 226 and if the answer is correct, then in step 320 the call is allowed to ring through to the receiver's telephone 240 or 260.

On the other hand, if the answer is not correct (or is not received) then in step 332 the appropriate action is taken for incorrect answers as specified previously by the user in step 620. In other words, the specific action for that question may be taken, or the general action to be taken for all questions is performed. Once the action is taken then the process ends.

Call Challenge Implemented on Mobile Telephone

Figure 5:
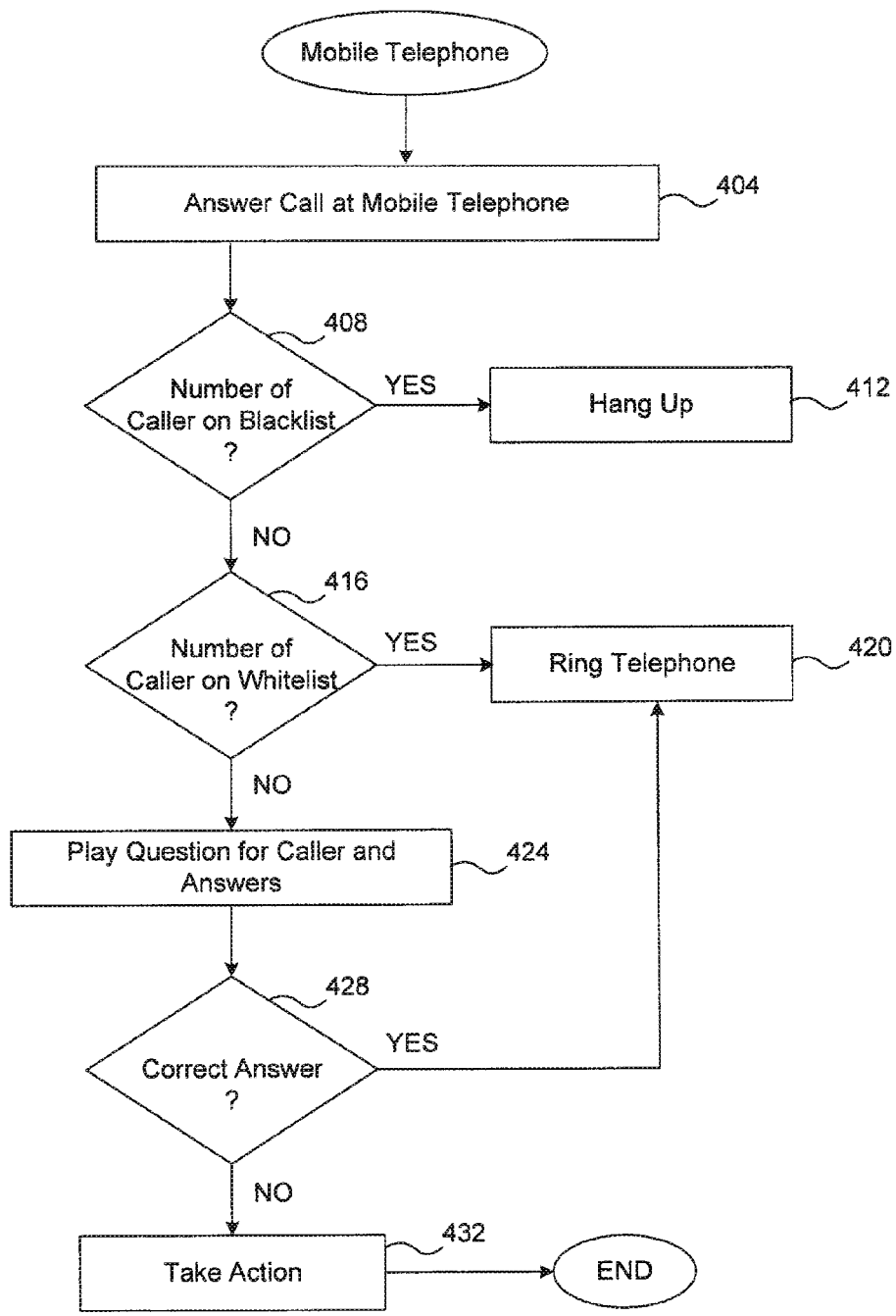
FIG. 5 is a flow diagram describing the embodiment in which the invention executes upon a mobile telephone.

As mentioned above, the present invention may be implemented exclusively or primarily upon a user's mobile telephone 240. FIG. 5 is a flow diagram describing the embodiment in which the invention executes upon a mobile telephone. In step 404 a call for a receiver from a caller having a particular telephone number is received and answered at a user's telephone 240. In one particular embodiment, the ringer or ring tone of the telephone is initially disabled so that the user is not bothered while the process determines whether or not the call is legitimate. The microphone on the telephone may also be disabled so that the caller does not hear any sound associated with the receiver. While caller identification on the screen of the telephone and the speaker of the telephone may also be disabled, in one embodiment these features are left active so that the receiver may view the caller's telephone number or may hear any sounds from the caller.

Steps 408 and 416 determine whether this telephone number of the caller is present in a white list or blacklist stored in a database on telephone 240. If on a blacklist, then in step 412 the call may be rejected by simply hanging up, by terminating the call, by playing a pre-recorded message, etc. If on a white list, though, in step 420 the mobile telephone is allowed to ring, indicating to the receiver that a legitimate call has been received. If they had been disabled, the microphone and speaker are then enabled.

If, however, the caller's number is not present on either list, this indicates an unknown telephone call that might be a spam call. Accordingly, in step 424 telephone 240 then plays back a voice recording of the current question (stored in a database on the mobile telephone 240) over communications links 232 and 212 to be heard on the telephone 210 of the calling party. If instructed by the user, the telephone 240 may use the current question designated in step 624. Or, if there are multiple questions, the telephone may choose one of the questions randomly, or cycle through the questions sequentially. Once the question has been presented to the caller, the answers are also presented. In one embodiment, each possible answer is presented along with a number (or letter) indicating which key the caller should press (or speak) on his or her calling telephone. The invention is also able to randomly present the possible answers such that the answers appear in a different order each time the question is asked, or, each possible answer is associated with a different number (or letter) each time the question is asked. In another embodiment, identifying numbers (or letters) for each answer need not be used, and the caller is simply instructed to press a key (or speak a word) when the answer is presented. Preferably, each set of answers always includes the choice of "Other," thus making it more difficult for a spammer to guess the correct answer.

The caller is directed to answer the question by speaking a number or word, pressing a button, pressing a key, etc. Any received answer is checked against the possible answers in database 226 (of the mobile telephone) and if the answer is correct, then in step 420 the mobile telephone is allowed to ring as described above.

On the other hand, if the answer is not correct (or is not received) then in step 432 the appropriate action is taken for incorrect answers as specified previously by the user in step 620 and stored in database 228 (also located on the user's mobile telephone). In other words, the specific action for that question may be taken, or the general action to be taken for all questions is performed. Once the action is taken then the process ends.

Call Challenge Implemented on Computing Device

Figure 6:
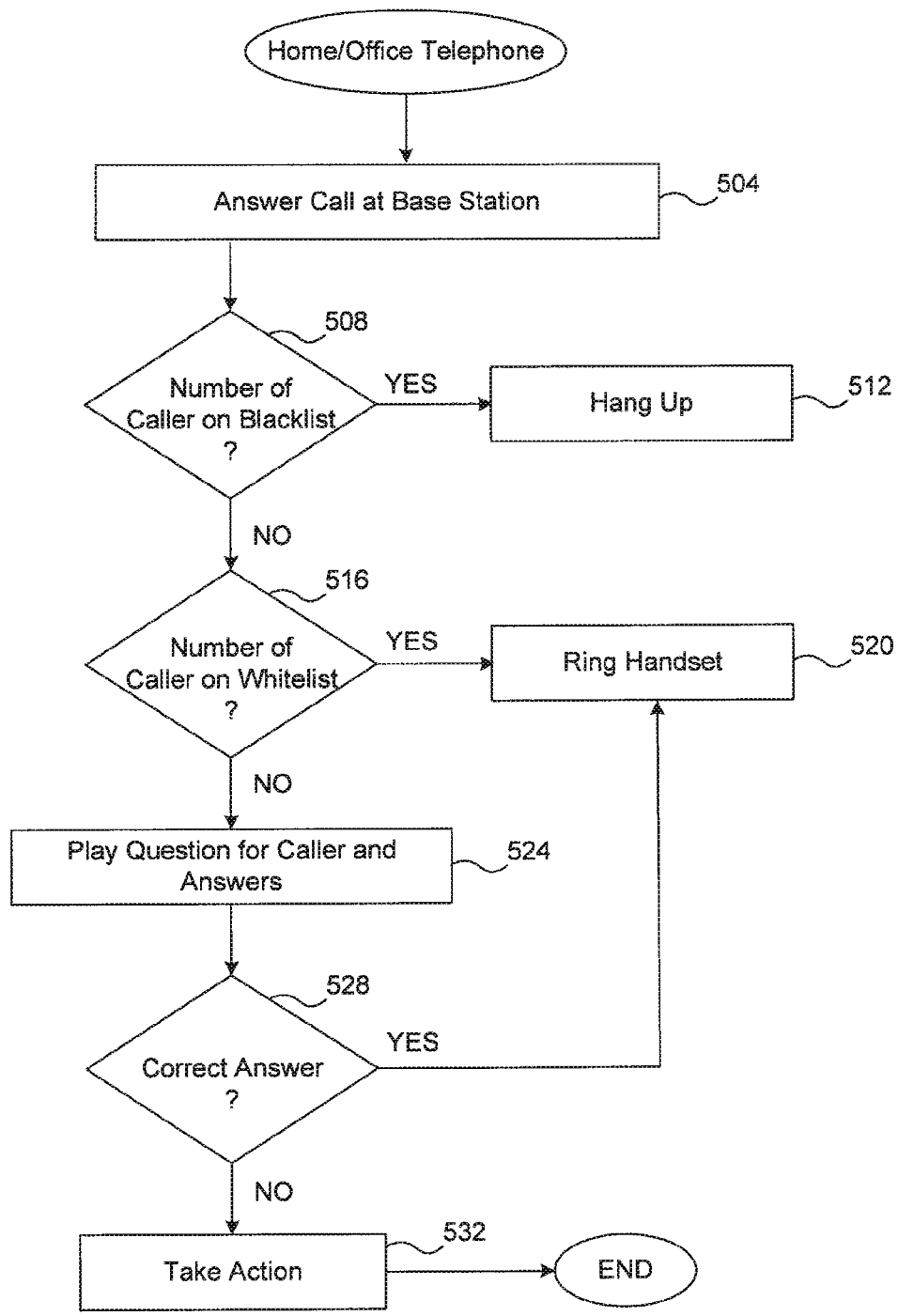
FIG. 6 is a flow diagram describing the embodiment in which the invention executes upon a base station that incorporates a computer.

As mentioned above, the present invention may be implemented exclusively or primarily upon a computing device 250 located typically at a user's home or office. FIG. 6 is a flow diagram describing the embodiment in which the invention executes upon a base station that incorporates a computer. In step 504 a call for a receiver from a caller having a particular telephone number is received and answered at a base station 250. The base station may be, for example, an answering machine, a traditional telephone incorporating computer, a computer, a caller identification device, a PBX located within the business, etc.

In one particular embodiment, the ringer or ring tone of the associated telephone is initially disabled so that the user is not bothered while the process determines whether or not the call is legitimate. The microphone on the telephone may also be disabled so that the caller does not hear any sound associated with the receiver. While caller identification on the screen of the device and the speaker of the telephone may also be disabled, in one embodiment these features are left active so that the receiver may view the caller's telephone number or may hear any sounds from the caller.

Steps 508 and 516 determine whether this telephone number of the caller is present in a white list or blacklist stored in a database on device 250. If on a blacklist, then in step 512 the call may be rejected by simply hanging up, by terminating the call, by playing a pre-recorded message, etc. If on a white list, though, in step 520 the associated telephone is allowed to ring, indicating to the receiver that a legitimate call has been received. If they had been disabled, the microphone and speaker are then enabled.

If, however, the caller's number is not present on either list, this indicates an unknown telephone call that might be a spam call. Accordingly, in step 524 device 250 then plays back a voice recording of the current question (stored in a database in the device) over communications links 234 and 212 to be heard on the telephone 210 of the calling party. If instructed by the user, the device may use the current question designated in step 624. Or, if there are multiple questions, the device may choose one of the questions randomly, or cycle through the questions sequentially. Once the question has been presented to the caller, the answers are also presented. In one embodiment, each possible answer is presented along with a number (or letter) indicating which key the caller should press (or speak) on his or her calling telephone. The invention is also able to randomly present the possible answers such that the answers appear in a different order each time the question is asked, or, each possible answer is associated with a different number (or letter) each time the question is asked. In another embodiment, identifying numbers (or letters) for each answer need not be used, and the caller is simply instructed to press a key (or speak a word) when the answer is presented. Preferably, each set of answers always includes the choice of "Other," thus making it more difficult for a spammer to guess the correct answer.

The caller is directed to answer the question by speaking a number or word, pressing a button, pressing a key, etc. Any received answer is checked against the possible answers in database 226 (of the device 250) and if the answer is correct, then in step 520 the device 250 is allowed to ring, for example by ringing the computer 250, ringing the receiver 260, etc.

On the other hand, if the answer is not correct (or is not received) then in step 532 the appropriate action is taken for incorrect answers as specified previously by the user in step 620 and stored in database 228 (also located on the device 250). In other words, the specific action for that question may be taken, or the general action to be taken for all questions is performed. Once the action is taken then the process ends.

Computer System Embodiment

Figure 7A:
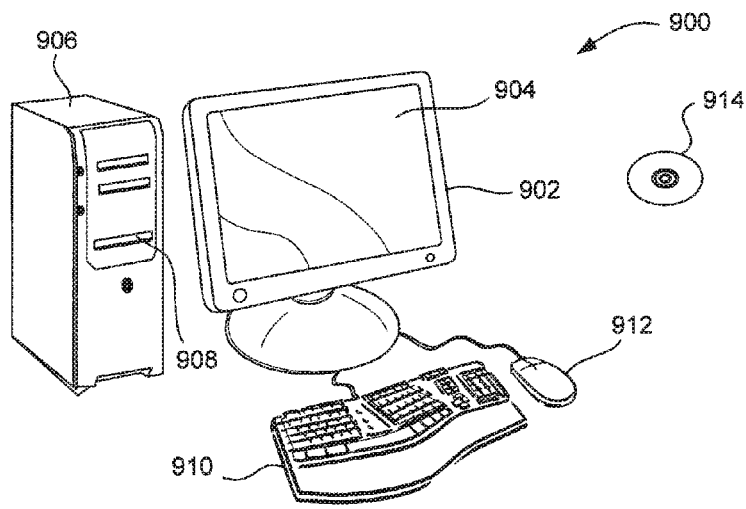
FIGS. 7A and 7B illustrate a computer system suitable for implementing embodiments of the present invention.
Figure 7B:
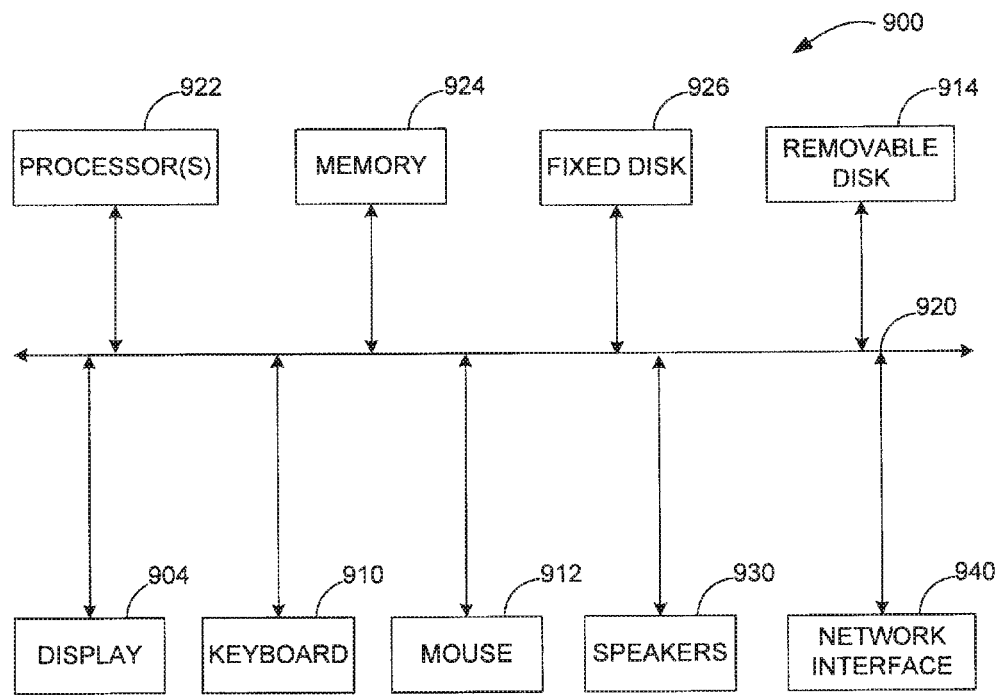

FIGS. 7A and 7B illustrate a computer system 900 suitable for implementing embodiments of the present invention. FIG.

7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of challenging an incoming telephone call, said method comprising:
    receiving a telephone call at a server computer from a caller intended for a receiver, said telephone call including a telephone number of said receiver;
    screening said telephone call at said server computer using a white list or a black list;
    splitting a functionality of said method by forwarding said telephone call to a computer remote from said server computer;
    accessing a database of said computer that includes at least one question and associated answers using said telephone number;
    playing an audio version of said question back to said caller from said computer;
    playing an audio version of said answers back to said caller, wherein each answer is associated with an identifier, and wherein each answer is associated with a different identifier each time said audio version of said question is played back;
    accepting a caller answer at said computer that includes one of said identifiers;
    allowing said telephone call to proceed to a telephone associated with said telephone number if it is determined that said caller answer matches a correct one of said associated answers; and
    not allowing said telephone call to proceed to said telephone associated with said telephone number if it is determined that said caller answer does not match a correct one of said associated answers.

2. The method as recited in claim 1 further comprising:
    choosing said question randomly from among a plurality of questions in said database.

3. The method as recited in claim 1 further comprising:
    receiving said telephone call that includes a telephone number of said caller; and
    adding said caller telephone number to a blacklist database of said computer that is associated with said telephone number when it is determined that said caller answer does not match a correct one of said associated answers.

4. The method as recited in claim 1 further comprising:
    said telephone associated with said telephone number not receiving said telephone call when it is determined that said caller answer does not match a correct one of said associated answers.

5. The method as recited in claim 1 wherein said at least one question includes information personal to said receiver.

6. The method as recited in claim 1 further comprising:
    playing an audio version of said answers back to said caller in a random order.

7. A method of challenging an incoming telephone call, said method comprising:
    answering a telephone call at a server computer from a caller;
    screening said telephone call at said server computer using a white list or a black list;

splitting a functionality of said method by forwarding said telephone call to a mobile telephone remote from said server computer;

accessing a database of said mobile telephone that includes at least one question and associated answers;

playing an audio version of said question back to said caller from said mobile telephone;

playing an audio version of said answers back to said caller, wherein each answer is associated with an identifier, and wherein each answer is associated with a different identifier each time said audio version of said question is played back;

accepting a caller answer at said mobile telephone that includes one of said identifiers;

allowing said mobile telephone to alert a user if it is determined that said caller answer matches a correct one of said associated answers; and terminating said telephone call if it is determined that said caller answer does not match a correct one of said associated answers.

8. The method as recited in claim 7 further comprising:
disabling an incoming call alert mechanism of said mobile telephone such that said answering said telephone call does not alert said user.

9. The method as recited in claim 7 further comprising:
receiving said telephone call that includes a telephone number of said caller; and
checking said caller telephone number against a database to determine whether or not to alert said user of said telephone call.

10. The method as recited in claim 7 further comprising:
receiving said telephone call that includes a telephone number of said caller; and
adding said caller telephone number to a blacklist database of said mobile telephone when it is determined that said caller answer does not match a correct one of said associated answers.

11. The method as recited in claim 7 further comprising:
said mobile telephone not alerting said user regarding said telephone call when it is determined that said caller answer does not match a correct one of said associated answers.

12. The method as recited in claim 7 further comprising:
choosing said question randomly from among a plurality of questions in said database.

13. A method of challenging an incoming telephone call, said method comprising:
answering a telephone call at a server computer from a caller;

screening said telephone call at said server computer using a white list or a black list;

splitting a functionality of said method by forwarding said telephone call to a base station remote from said server computer;

accessing a database of said base station that includes at least one question and associated answers;

playing an audio version of said question back to said caller from said base station;

playing an audio version of said answers back to said caller, wherein each answer is associated with an identifier, and wherein each answer is associated with a different identifier each time said audio version of said question is played back;

accepting a caller answer at said base station that includes one of said identifiers;

allowing said base station to ring a telephone associated with said base station if it is determined that said caller answer matches a correct one of said associated answers; and terminating said telephone call if it is determined that said caller answer does not match a correct one of said associated answers.

14. The method as recited in claim 13 further comprising:
disabling an incoming call alert mechanism of said base station such that said answering said telephone call does not alert said user.

15. The method as recited in claim 13 further comprising:
receiving said telephone call that includes a telephone number of said caller; and
checking said caller telephone number against a database to determine whether or not to alert said user of said telephone call.

16. The method as recited in claim 13 further comprising:
receiving said telephone call that includes a telephone number of said caller; and
adding said caller telephone number to a blacklist database of said base station when it is determined that said caller answer does not match a correct one of said associated answers.

17. The method as recited in claim 13 further comprising:
said base station not alerting said user regarding said telephone call when it is determined that said caller answer does not match a correct one of said associated answers.

18. The method as recited in claim 13 wherein said at least one question includes information personal to said user.

* * * * *